United States Patent
Ross, Jr. et al.

(10) Patent No.: US 9,434,586 B2
(45) Date of Patent: Sep. 6, 2016

(54) TRACKED UNDERCARRIAGE ADAPTED FOR MODULAR RECONFIGURATION

(71) Applicant: Custom Truck & Equipment LLC, Kansas City, MO (US)

(72) Inventors: Fredrick Martin Ross, Jr., Kansas City, MO (US); James H. Esch, Georgetown, TX (US)

(73) Assignee: Custom Truck & Equipment LLC, Kansas City, MO (US)

( * ) Notice: Subject to any disclaimer, the term of this patent is extended or adjusted under 35 U.S.C. 154(b) by 146 days.

(21) Appl. No.: 14/300,061

(22) Filed: Jun. 9, 2014

(65) Prior Publication Data

US 2014/0360811 A1 Dec. 11, 2014

Related U.S. Application Data

(60) Provisional application No. 61/833,295, filed on Jun. 10, 2013.

(51) Int. Cl.
| | |
|---|---|
| *B62D 55/06* | (2006.01) |
| *B66F 11/04* | (2006.01) |
| *B62D 55/08* | (2006.01) |
| *B62D 55/084* | (2006.01) |
| *B62D 63/02* | (2006.01) |

(Continued)

(52) U.S. Cl.
CPC ............ *B66F 11/044* (2013.01); *B62D 55/06* (2013.01); *B62D 55/08* (2013.01); *B62D 55/084* (2013.01); *B62D 63/025* (2013.01); *B66F 11/046* (2013.01); *E02F 3/286* (2013.01); *E02F 9/02* (2013.01); *Y10T 29/49622* (2015.01)

(58) Field of Classification Search
CPC .... B62D 55/06; B62D 55/08; B62D 55/084; B62D 63/025
USPC .......................................... 180/9.1
See application file for complete search history.

(56) References Cited

U.S. PATENT DOCUMENTS

| | | | | |
|---|---|---|---|---|
| 4,955,455 A | * | 9/1990 | Albright | ............... B60K 11/00 180/291 |
| 5,171,124 A | * | 12/1992 | Foster | ...................... E02F 3/30 212/302 |
| 6,293,364 B1 | * | 9/2001 | Anderson | ........... B60K 15/063 180/312 |

(Continued)

OTHER PUBLICATIONS

Construction Attachments X-treme Duty Rear Stabilizers for Bobcat Skid Steer, Dec. 5, 2010.*

Primary Examiner — Kevin Hurley
Assistant Examiner — Michael Stabley
(74) Attorney, Agent, or Firm — Lathrop & Gage LLP (57) ABSTRACT

A crawler undercarriage configured for modular attachment of work tools wherein the crawler undercarriage operates on at least two endless crawler tracks. Each crawler track extends around and is driven by a crawler sprocket at one extremity of its travel and extending around an idler roller at its other extremity of travel. The crawler undercarriage configured for modular attachment of work tools comprising a longitudinally extending center channel for securing a modular tool. The crawler undercarriage also includes at least one substantially vertical support member extending upwardly from the center channel. The crawler undercarriage also includes at least one mounting bracket secured to extending upwardly from the substantially vertical support member, wherein the modular member is secured to the at least one lower mounting bracket on the substantially vertical support member.

13 Claims, 8 Drawing Sheets

(51) Int. Cl.
   *E02F 3/28* (2006.01)
   *E02F 9/02* (2006.01)

(56) References Cited

U.S. PATENT DOCUMENTS

| | | | | |
|---|---|---|---|---|
| 7,156,200 B2* | 1/2007 | Dershem | ............... | B62D 21/186 180/311 |
| 7,401,673 B2* | 7/2008 | Fukazawa | ............. | B60R 21/131 180/89.12 |
| 7,798,260 B2* | 9/2010 | Albright | ............ | B62D 33/0604 180/6.7 |
| 7,815,000 B2* | 10/2010 | Kisse | .................. | B62D 21/186 180/9.1 |
| 7,866,700 B2* | 1/2011 | Weibling | ............. | B62D 21/186 180/299 |
| 8,016,065 B2* | 9/2011 | Osborn | .................... | B60K 1/02 180/233 |
| 8,103,418 B2* | 1/2012 | Osswald | ................ | B62D 21/14 187/224 |
| 8,201,649 B2* | 6/2012 | Andrus | ................ | B62D 55/084 180/9.1 |
| 8,465,103 B2* | 6/2013 | Burt | ..................... | B62D 51/007 180/9.22 |
| 2014/0031977 A1* | 1/2014 | Goldenberg | ............... | B25J 9/08 700/245 |
| 2014/0174839 A1* | 6/2014 | Steben | ................... | B62D 33/06 180/9.23 |
| 2015/0008052 A1* | 1/2015 | Steben | ................... | B62D 33/06 180/9.23 |

* cited by examiner

TRACKED UNDERCARRIAGE ADAPTED FOR MODULAR RECONFIGURATION

RELATED APPLICATION

This application claims the benefit of priority to U.S. Provisional Application No. 61/833,295 filed Jun. 10, 2013, the disclosure of which is incorporated herein by reference.

FIELD

This disclosure relates generally to a crawler undercarriage configured for modular attachment of work tools.

BACKGROUND

Tracked vehicles dedicated to perform particular tasks commonly include a structurally rigid chassis which provides support for the cab, engine, drive train and associated hydraulic systems and/or other power take-off mechanisms. The chassis is then generally combined with a permanently mounted single-function or dedicated work tool constructed as a separate unit. Thus, the chassis is designed to support a permanently attached special function work tool such as a scissor lift, dump bucket, blade or telescoping arm.

Construction equipment, and particularly heavy equipment outfitted with tracks are capital intensive to purchase and to maintain. In order to limit the need for recurring capital outlays on expensive tracked vehicles with varying work tools the disclosed technology allows heavy equipment to be quickly and efficiently reconfigured with modular work tools capable of being mounted on the tracked undercarriage.

Tracked vehicle manufacturers face differing demands from their customers. Tracked vehicles are built in a wide variety of configurations with many optional accessories to meet these differing demands. A tracked vehicle line may be offered with dozens of different optional accessories that can be combined in hundreds of different ways. The same line of tracked vehicles may be sold to customers who range from an excavating company to a telecommunications company to a contractor installing high voltage transmission lines across the country. A general excavator may want capability to push large amounts of soil while a telecommunications company may want equipment that can not only move soil but also quickly auger holes for cell tower supports while a contractor for a utility may need all of the above capabilities as well as a personnel bucket on a telescoping arm for lineman to install the high tension transmission lines.

Tracked vehicles are built on assembly lines to spread the costs of production over many units. The cost to assemble a line of tracked vehicles is generally proportional to the number of combinations of options available in which it can be built. The larger the number of options available on a tracked vehicle, then, typically the higher the cost to build the tracked vehicle. One of the ways in which tracked vehicle reseller can offer a variety of optional accessories on the tracked vehicle at a retrofit location, and at a much reduced cost, is through the use of modularity.

SUMMARY

In order to optimize both equipment utilization and the capital outlay associated with a basic crawler undercarriage a center channel is configured to support a modular work tool such as a telescoping arm. The modular tool can quickly be removed and replaced with a separate work tool thereby allowing the owner or operator to leverage the use of the undercarriage. More specifically this disclosure concerns the configuration of the crawler undercarriage thereby allowing modular reconfiguration.

The disclosed technology will enable a single tracked undercarriage to be quickly reconfigured to a wide range of options including, but not limited to: dump box, scissor lift, digger derrick, personal lift, wire tensioner, personnel carrier, hydraulic crane, portable cement mixer and a service body (for transporting repair equipment to a distant remote location).

The disclosed technology overcomes the problems of the prior art, namely limited functionality of a tracked undercarriage with a single work took permanently secured thereto, by providing a system for modular interchange of the work tools.

Replacing the modular work tool instead of purchasing or leasing a separate tracked vehicle with a separate work tool can result in considerable savings on projects requiring the utilization of the tracked vehicles.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
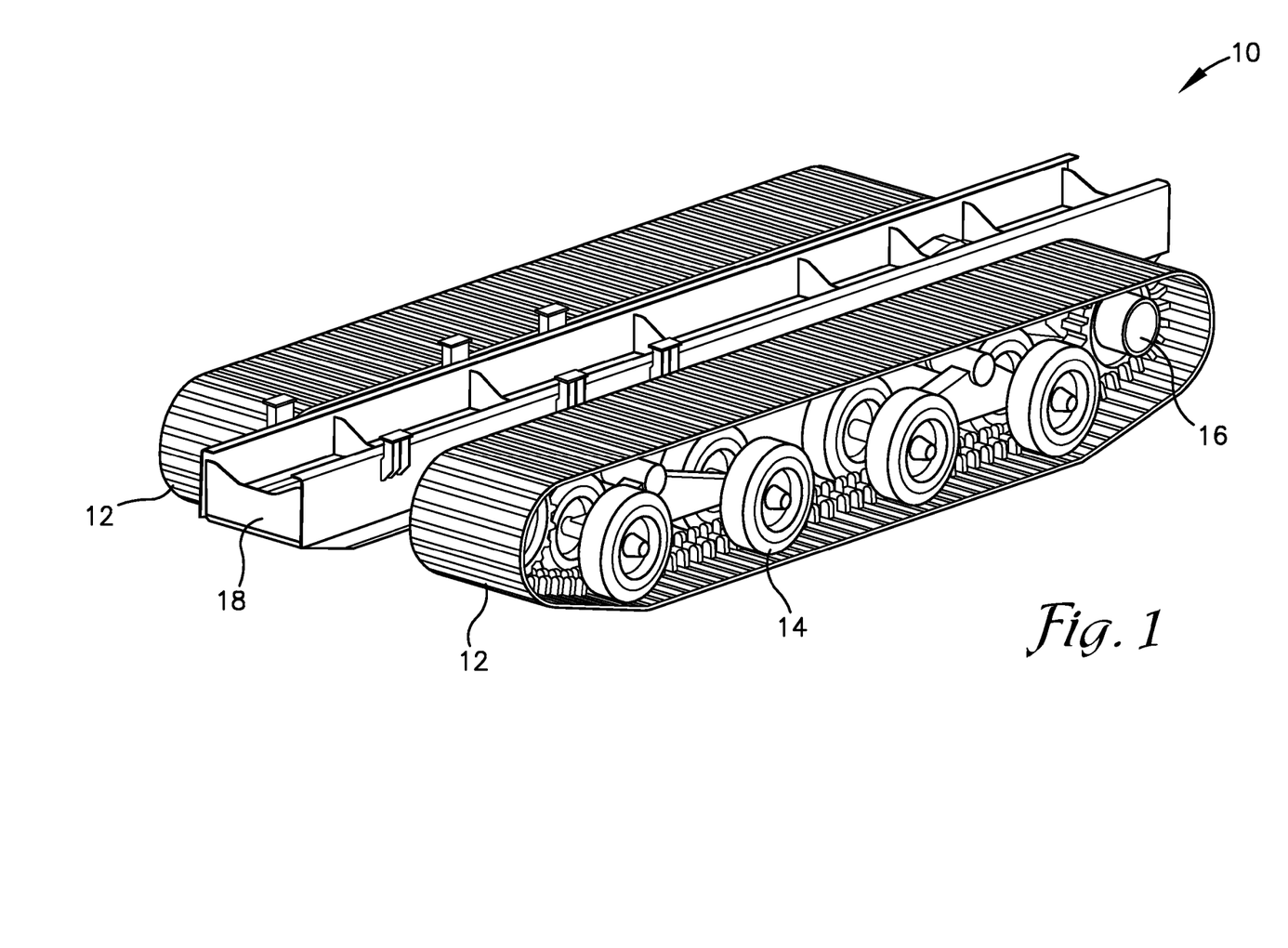
FIG. 1 is a perspective view of an embodiment of the crawler undercarriage.
Figure 2:
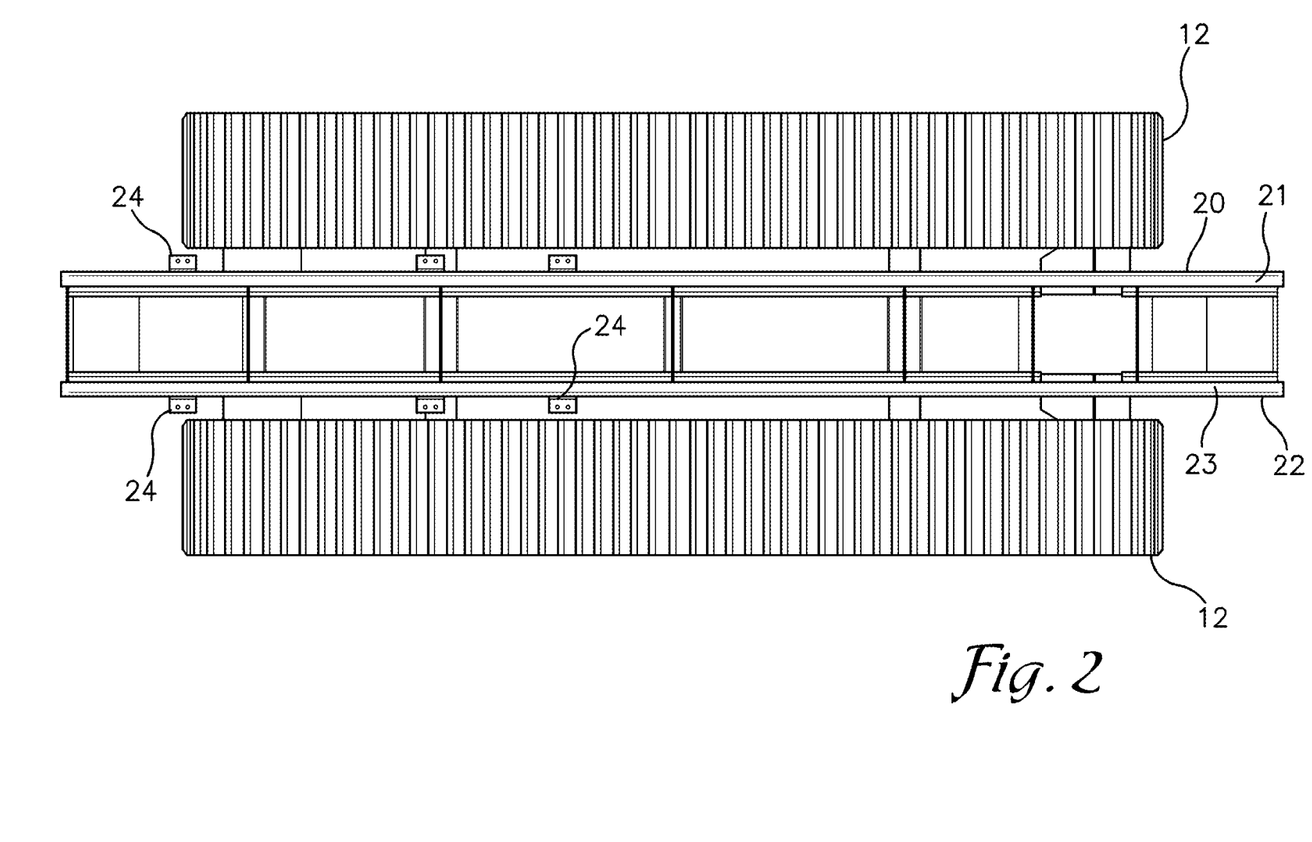
FIG. 2 is a top plan view of an embodiment of the crawler undercarriage.
Figure 3:
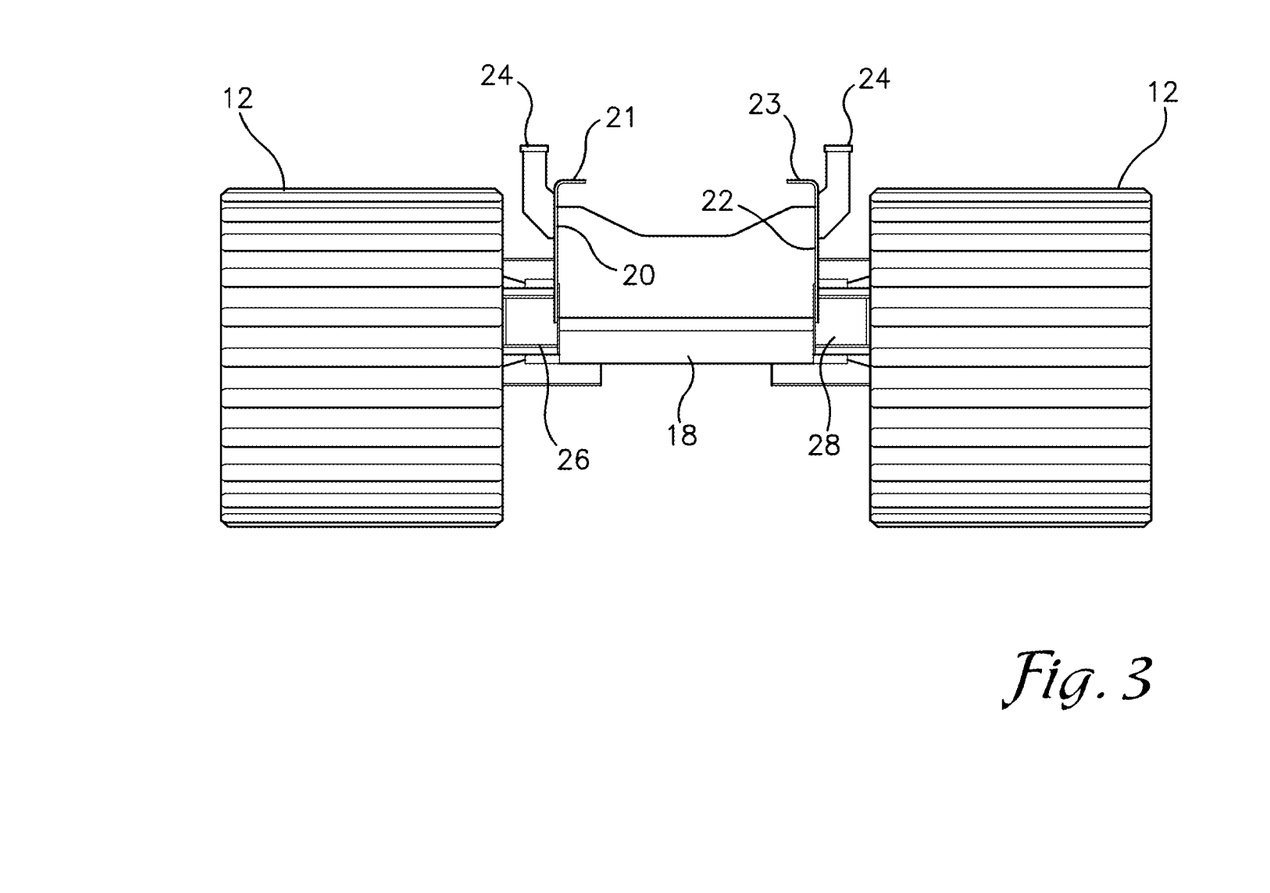
FIG. 3 is a rear elevation view of an embodiment of the crawler undercarriage depicting the center channel and brackets.

Referring to FIG. 1, a crawler undercarriage 10 is schematically depicted. The undercarriage 10 includes at least two endless tracks 12, with idlers 14 and drive wheels 16. The two endless tracks 12 are separated by a center channel 18 that extends longitudinally beyond the ends of the undercarriage 10. Referring to FIGS. 2 and 3, the center channel 18 includes side walls 20, 22 and horizontally extending flanges 21, 23. These side walls 20, 22 and horizontal flanges 21, 23 are fabricated to match the dimensions (i.e., height, thickness and spacing) of a standard commercial truck frame so that any equipment designed to be installed on a commercial truck frame can be readily installed on the crawler undercarriage. Secured to the sidewalls 20, 22 are brackets 24 that are used to support the engine and cab components discussed below.

Figure 4:
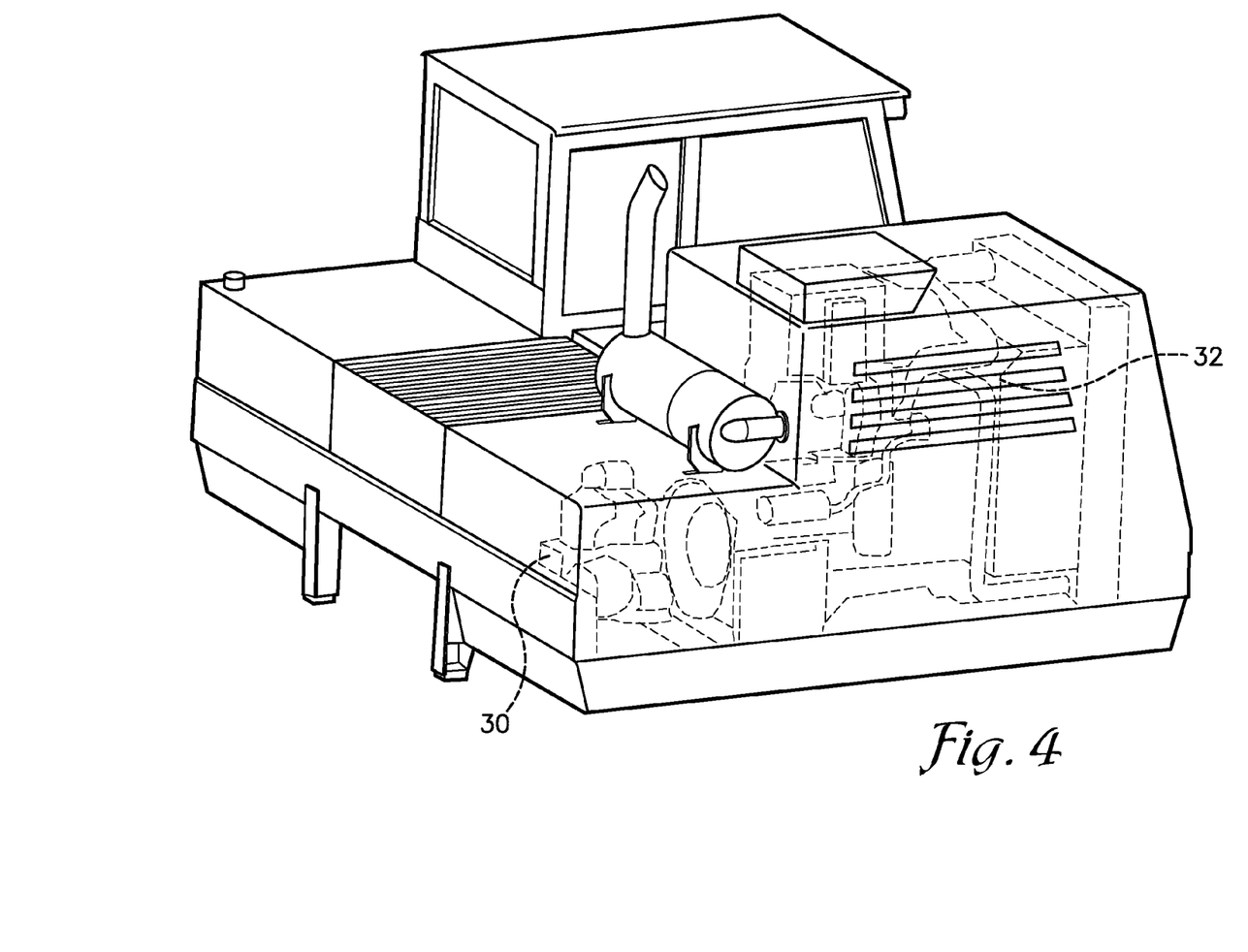
FIG. 4. is a perspective view of an embodiment of the operators cab and a phantom configuration of the engine shroud revealing the outline of the engine and hydraulic pump.
Figure 5:
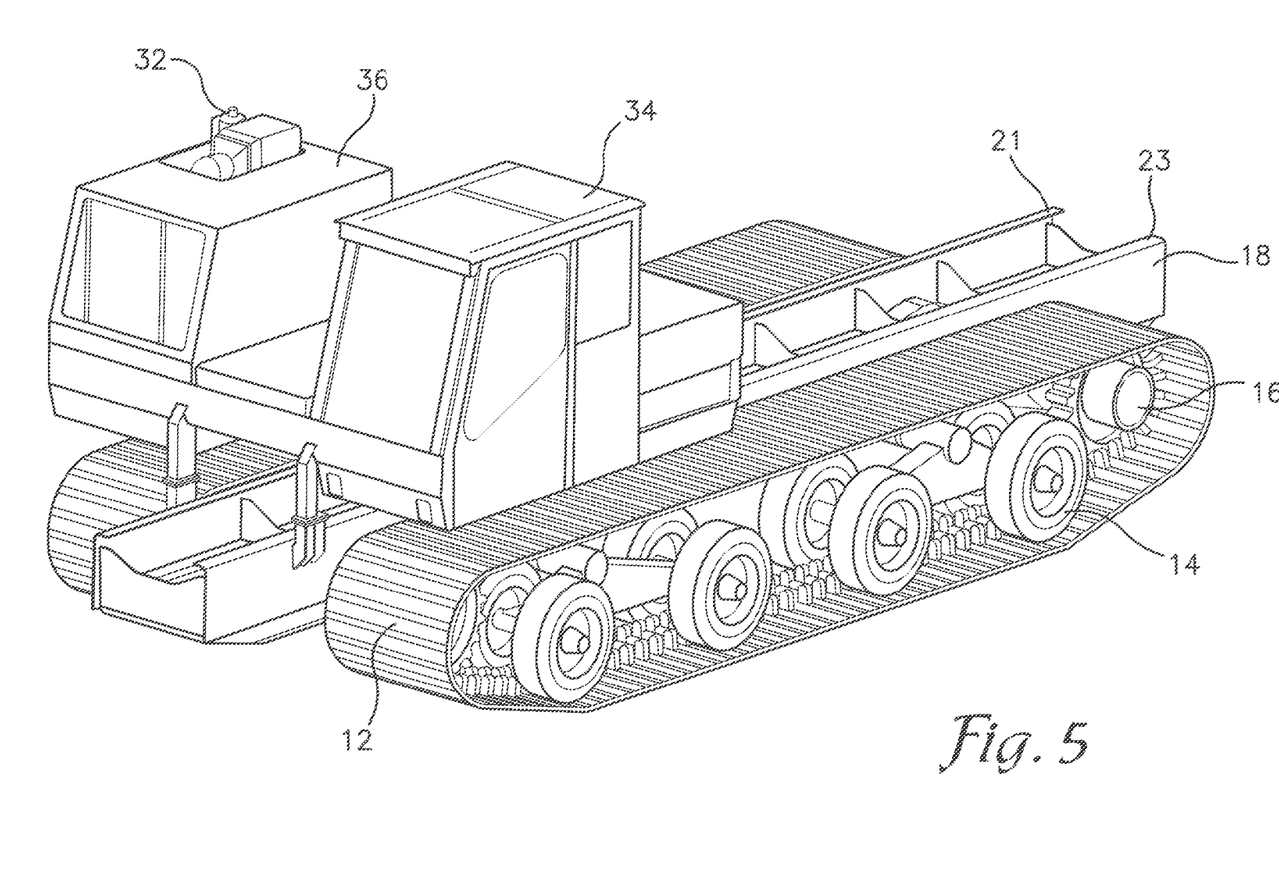
FIG. 5 is a perspective view of an embodiment of the crawler undercarriage with the operator's cab and engine shroud with engine components exposed.

Referring to FIG. 3, the drive motor assemblies 26, 28 can partially be seen between the tracks 12 and the center channel 18. The drive motors 26, 28 are each powered by a separate hydraulic pump 30 with each pump operatively coupled to a single internal combustion engine 32 as best seen in FIG. 4. Shown in FIG. 5, are the operator's cab 34 along with the housing 36 that covers the engine 32 and the hydraulic pumps 30. Electrical lines and hydraulic hoses (not shown) extend along the center channel 18 between the hydraulic pump 30, the motor 32 and operator's cab 34 to provide system feedback to the operator (engine temp, hydraulic pressure, etc.) fluid flow to the drive motor assemblies 26, 28 and the associated modular work tool.

Figure 6:
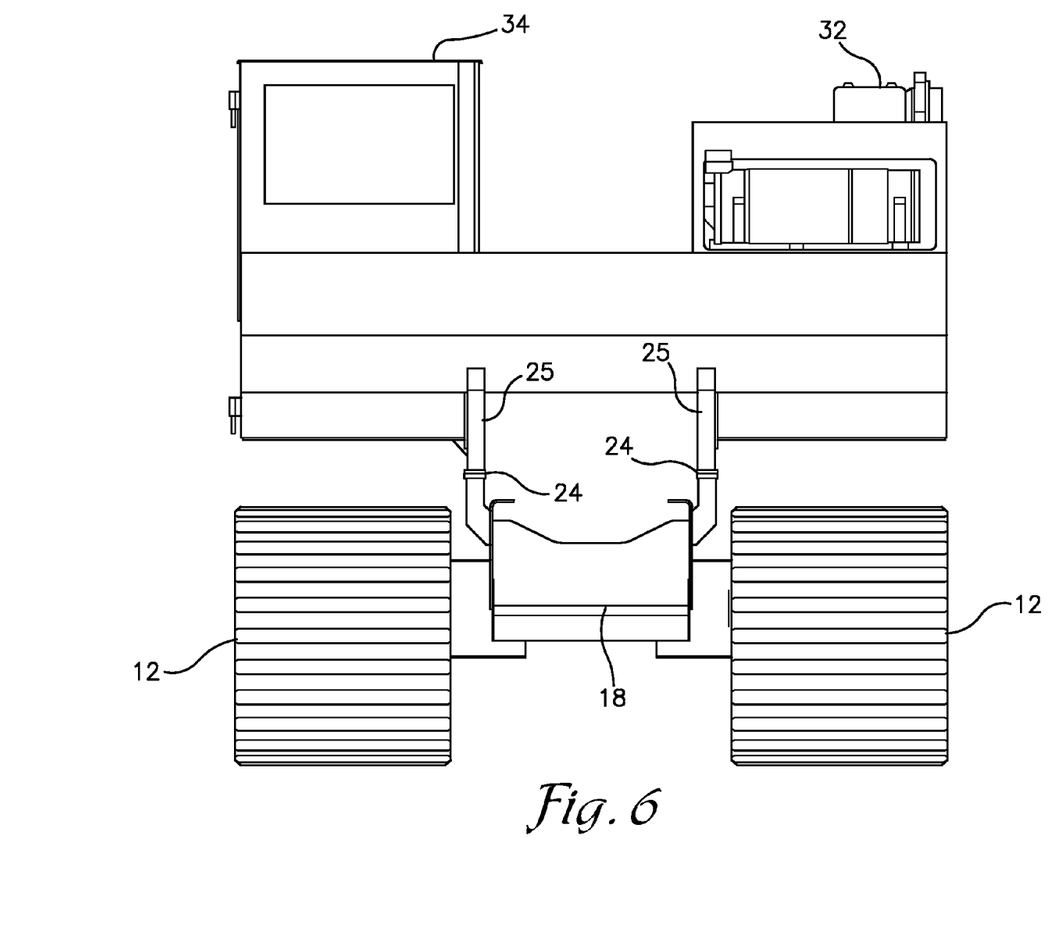
FIG. 6 is a rear elevation view of an embodiment of the crawler undercarriage with the operator's cab and engine shroud with engine components exposed.

FIG. 6 illustrates the means by which the cab 34 and the engine 32 and hydraulic pump 30 are secured to the center channel brackets 24. To mount the cab 34 and engine/pump 32, 30 assembly to the center channel brackets 24 a total of twelve bolts (2 per bracket) are preferably used to secure the modular units in position. As is well known in the art, a greater or lesser number of bolts could be used to secure the modular units to the undercarriage. The downwardly extending brackets 25 from the modular cab/engine/pump assembly are positioned atop the center channel brackets 24 and bolted together. This process effectively secures the modular components to the undercarriage. As previously noted, hydraulic lines and electrical control lines emanating from the operator's cab 34 and the engine/pump housing 36 can easily be laid into the center channel 18 and extend to the drive motors 26, 28. The wide and deep center channel 18 readily accommodates, without interference, a robust collection of supply and return hydraulic hoses as well heavy duty electrical lines.

Figure 7:
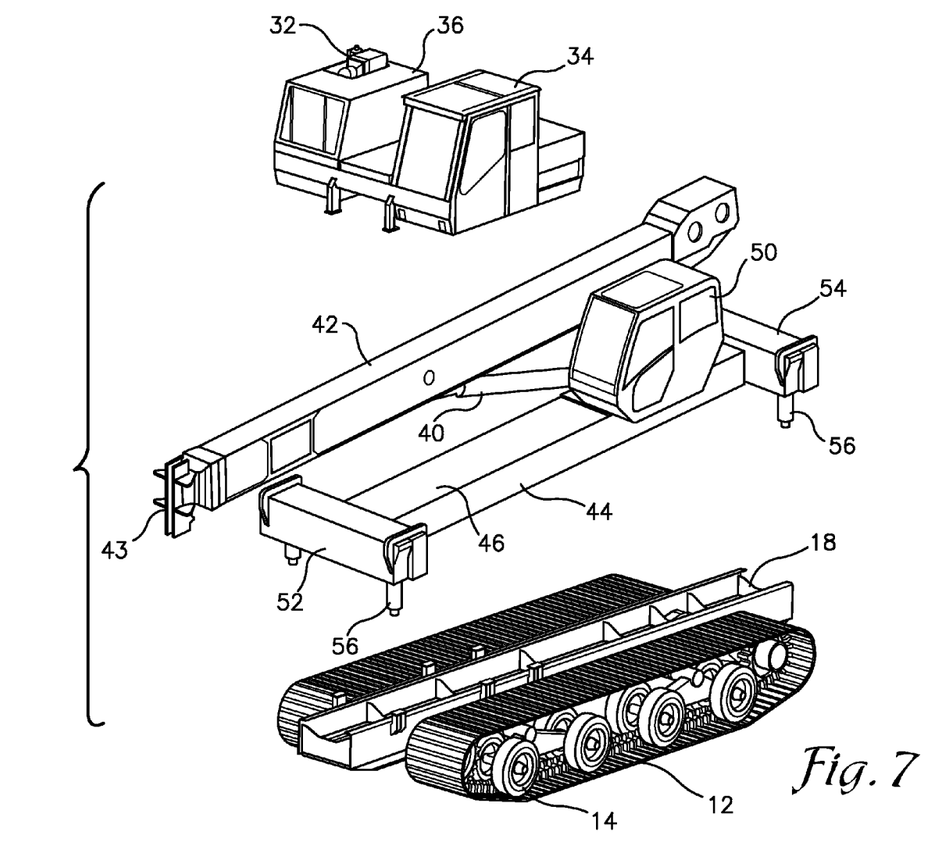
FIG. 7. is an exploded perspective of the modular assembly revealing the tracked undercarriage as well as the relative placement of the extensible arm with cab, engine shroud, torsion bar and arm cab.

FIG. 7 illustrates well the modularity of the disclosed technology. An exemplary work tool comprising a telescoping arm 42 is positioned adjacent a torsion box 44. The torsion box 44 forward element 46 is disposed beneath the operator cab 34 and the engine/pump 32, 30 assembly. This configuration necessitates that the torsion box 44 be laid into the center channel 18 prior to the installation of the operator cab and engine/engine housing 32, 36; however, as previously discussed, the modular cab and engine assembly can be disconnected from the crawler undercarriage 10 simply by removing a plurality of bolts and disconnecting the hydraulic hoses and electrical connections that will all be configured with quick disconnect elements to facilitate the rapid change-out of the modular work tool.

The torsion box 44 is a rectangular box that spans the entire length of the crawler undercarriage 10. When coupled with, for example, a telescoping arm 42, telescoping arm turret (not shown) and the operator's cab 50 the torsion box 44 provides the necessary rigidity of the combined system by allowing the forces generated by the telescoping arm 42 when in an extended state to be transferred along the entire length of the torsion box 44 to the crawler undercarriage 10 thereby effectively distributing the load and avoiding highly concentrated loads in small areas. The telescoping arm 42 can extend outwardly as well as in a radial fashion due to a hydraulic cylinder 40 that when actuated rotates the arm upward. In most cases the telescoping arm 42 will have a specialized work tool located at the far end 43, such as a bucket (not shown), for use by lineman working on high voltage transmission lines.

As seen in FIG. 7, the torsion box 44 typically includes a front outrigger 52 and a rear outrigger 54. The outriggers 52, 54 provide stability against tipping and include hydraulic rams 56 that extend downwardly against the ground to prevent tipping of the entire tracked assembly when, for example, the telescoping arm is fully extended and carrying loads near capacity. The hydraulic rams 56 are supplied with pressurized hydraulic fluid by a hydraulic pump (not shown) generally distinct from those that provide fluid delivery to the drive motor assemblies 26, 28 for the tracked undercarriage 10.

Figure 8:
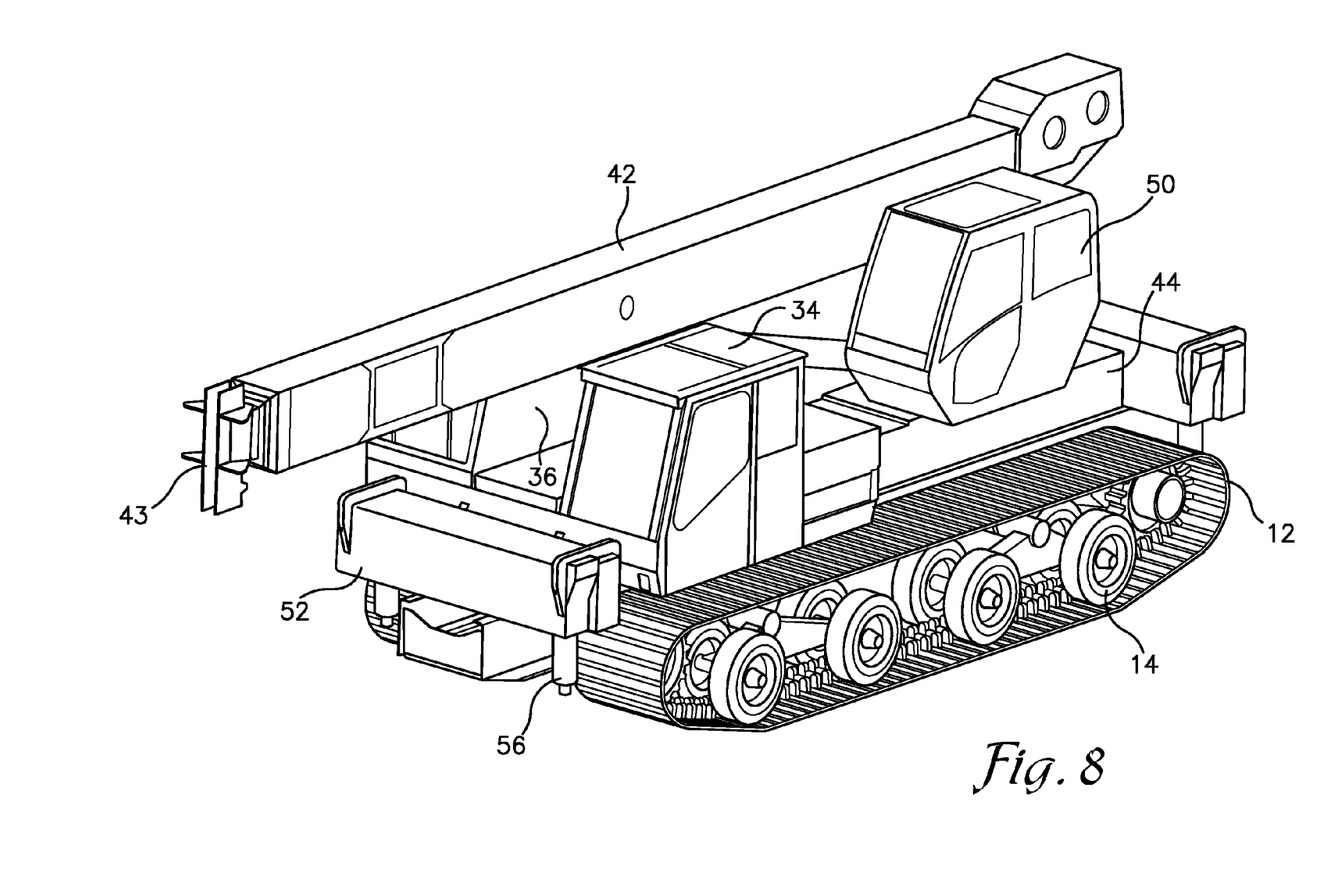
FIG. 8 is a perspective view of an embodiment of the tracked undercarriage with modular reconfiguration capabilities illustrating the placement of the undercarriage, extensible arm, arm and operator cabs and torsion box.

A fully configured crawler undercarriage with a modular telescoping arm assembly 42 is shown in FIG. 8. The extensible arm 42 when in the lowermost position fits comfortably between the cab 34 and the engine housing 36. The particular advantage of the crawler undercarriage with the endless tracks for many applications is its capacity to traverse rough, snow laden or marshy terrain that may be impassible by wheeled vehicles. Moreover, with the wide tracks the crawler is less likely to harm sensitive habitats that are subject to damage or erosion caused by ruts from wheeled vehicles that spin their tires while attempting to climb slopes or traverse moisture laden soil.

In operation, the tracked undercarriage, utilizing a particular work tool can be quickly reconfigured to utilize another work tool. The cab and engine assembly can be lifted off by an overhead crane once the bolts securing the mating center channel brackets 24, 25 together have been removed and the quick disconnect elements of the hydraulic and electrical lines have been engaged. A telescoping arm with a torsion box can quickly be replaced with, for example, a scissor lift—torsion box combination with the aid of an overhead crane. Once the telescoping arm has been lifted off and set in a cradle, the scissor lift—torsion box modular work tool can be lifted into position and then rapidly secured to the crawler undercarriage.

Should it be determined that a modular work tool other than one with a torsion box is required, for example a dump box (not shown), the modular unit can be lifted by a crane onto the crawler undercarriage 10 and the dump box pivot point (not shown) and the hydraulic piston (not shown) can be quickly secured to the center channel 18. Once the pivot point of the dump box and the hydraulic piston are secured the fluid line pressurizing the hydraulic dump piston can be quickly connected to the piston and the modular assembly is now ready for operation. This same process can be repeated with numerous other work tools to accomplish the task at hand. The center channel 18 can be readily modified with brackets, or other functional hardware, to facilitate the securing of a wide range of work tools to the sidewalls 20, 22 and/or the horizontally extending flanges 21, 23.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

We claim:

1. In a track-type vehicle operating on at least two endless crawler tracks, each crawler track extending around and being driven by a drive sprocket at one extremity of the track's travel and extending around an idler sprocket at the track's other extremity of travel, and having a longitudinally extending center channel assembly for securing an engine and operator cab modular unit and work tool thereto, the center channel assembly comprising:
   at least two longitudinally extending vertical side walls extending upwardly from the center channel, the upwardly extending vertical walls each having a horizontally extending flange; and
   at least one center channel bracket extending upwardly from each of the vertical side walls, wherein at least two brackets extend downwardly from the engine and operator cab modular unit and are mounted directly upon the at least one center channel bracket on each side of the vertical wall and the work tool is laid directly atop each of the horizontally extending flanges and detachably secured to the at least two longitudinally extending vertical side walls.

2. The center channel assembly of claim 1, wherein the work tool utilizes a base unit.

3. The center channel assembly of claim 2, wherein the work tool base unit comprises a torsion box with first and second longitudinal ends.

4. The center channel assembly of claim 2, wherein the operator's cab and a telescopic lifting arm are operatively coupled to the torsion box.

5. The center channel assembly of claim 3, wherein a personnel bucket is operatively coupled to a telescopic lifting arm.

6. The center channel assembly of claim 3, wherein a dump body is operatively coupled to the torsion box.

7. The center channel assembly of claim 3, wherein a first and second outrigger unit are operatively coupled to the torsion box first and second longitudinal ends.

8. The center channel assembly of claim 1, wherein the operator cab is for housing an operator to control movement of the crawler tracks.

9. The center channel assembly of claim 1, wherein the engine is operatively coupled to a hydraulic pump.

10. The center channel assembly of claim 9, wherein the hydraulic pump provides pressurized hydraulic fluid to a hydraulic motor.

11. A crawler undercarriage configured for modular attachment of work tools, the crawler undercarriage operating on at least two endless crawler tracks, each crawler track extending around and being driven by a crawler sprocket at one extremity of the track's travel and extending around an idler roller at the track's other extremity of travel, the crawler undercarriage configured for modular attachment of work tools comprising;
   a longitudinally extending center channel for securing a modular member thereto;
   at least one substantially vertical support member extending upwardly from the center channel, a horizontally extending flange extending outwardly from the at least one substantially vertical support member; and
   at least one center channel bracket secured to and extending upwardly from the substantially vertical support member, wherein an engine and cab modular unit is mounted atop the at least one center channel bracket on the substantially vertical support member, and a torsion box is detachably secured to at least one of the vertical support member and the horizontally extending flange.

12. The crawler undercarriage of claim 11, wherein the modular member comprises a work tool with a base member.

13. A modular work tool system for attachment to a tracked undercarriage, the modular work tool system comprising:
   a work tool;
   an engine and operator cab modular unit with at least two downwardly extending brackets for mounting to the work tool system, the engine and operator cab of the modular unit separated by a distance sufficient to allow stowing of a portion of the work tool there between;
   a torsion box spanning the entire length of the tracked undercarriage, the torsion box further comprising front and rear outriggers for stabilizing the tracked undercarriage when the modular work tool system is in operation;
   a crawler undercarriage, the crawler undercarriage operating on at least two endless crawler tracks and having a longitudinally extending center channel;
   at least two spaced apart vertical support members extending upwardly from the center channel, the spaced apart support members further comprising an outwardly extending flange atop the at least two vertical support members and upwardly extending center channel brackets for detachably securing the engine and operator cab modular unit to the vertical support members, wherein the torsion box is positioned atop the outwardly extending flanges and detachably secured to at least one of the vertical support members and the outwardly extending flanges, the torsion box disposed beneath the engine and operator cab modular unit.

* * * * *